(12) United States Patent
Granite et al.

(10) Patent No.: US 6,576,092 B2
(45) Date of Patent: Jun. 10, 2003

(54) METHOD FOR REMOVAL OF MERCURY FROM VARIOUS GAS STREAMS

(75) Inventors: Evan Granite, Wexford, PA (US); Henry W. Pennline, Bethel Park, PA (US)

(73) Assignee: The United States of America as represented by the U.S. Department of Energy, Washington, DC (US)

( * ) Notice: Subject to any disclaimer, the term of this patent is extended or adjusted under 35 U.S.C. 154(b) by 0 days.

(21) Appl. No.: 09/953,073

(22) Filed: Sep. 13, 2001

(65) Prior Publication Data

US 2003/0047440 A1 Mar. 13, 2003

(51) Int. Cl.[7] .............................. C07C 1/00; B01D 53/00
(52) U.S. Cl. ............................ 204/158.2; 204/157.15; 204/157.3
(58) Field of Search ..................... 204/157.3, 158.2, 204/157.41; 210/748

(56) References Cited

U.S. PATENT DOCUMENTS 6,248,217 B1 * 6/2001 Biswas et al. ............ 204/157.4

OTHER PUBLICATIONS

Lee et al., "Kinetics of Heterogeneous Mercury Reactions With Sorbent Particles: In Situ Capture Methodologies", Annual Meeting & Exhibition Proceedings CD–ROM—Air & Waste Management Association, 92nd, St. Louis, MO, United States, Jun. 20–24, 1999. *Abstract only.*

* cited by examiner

Primary Examiner—Edna Wong
(74) Attorney, Agent, or Firm—Bradley W. Smith; Mark P. Dvorscak; Paul A. Gottlieb

(57) ABSTRACT

The invention provides for a method for removing elemental mercury from a fluid, the method comprising irradiating the mercury with light having a wavelength of approximately 254 nm. The method is implemented in situ at various fuel combustion locations such as power plants and municipal incinerators.

20 Claims, 2 Drawing Sheets

METHOD FOR REMOVAL OF MERCURY FROM VARIOUS GAS STREAMS

CONTRACTUAL ORIGIN OF INVENTION

The United States Government has rights in this invention pursuant to employer-employee relationship of the U.S. Government to the inventors as U.S. Department of Energy employees at the National Energy Technology Laboratory.

BACKGROUND OF THE INVENTION

1. Field of the Invention

This invention relates to a method for minimizing mercury releases into the environment, and more particularly, this invention relates to a method for removing elemental mercury from a flue gas.

2. Background of the Invention

Emissions of elemental mercury continue to wreak havoc with the environment. Toxicological effects of mercury on humans and animals are well documented, and include neurological disorders, and kidney disorders. The most important route of absorption of elemental mercury is the respiratory tract, probably due to the mono-atomic nature and lipid solubility of mercury vapor. Indeed, deposition and retention of mercury in man is quite high, on the order of 80 percent. (John Doull, MD, et al., *Casarett and Doull's Toxicology* $2^{nd}$ Ed. (Macmillan Publishing Co., Inc., 1980)). The need for mercury removal from effluents is so great that the U.S. EPA has announced that coal-fired power plants will be regulated for mercury emissions by 2004.

Mercury is contained in flue gas, as are a myriad of respiratory system irritants, listed in Table 1 below:

TABLE 1

Typical Flue Gas Composition From a Coal-Burning Utility

| Species | Concentration |
|---|---|
| Hg | 1 ppb |
| $O_2$ | 4% |
| $H_2O$ | 6% |
| $SO_2$ | 1000 ppm |
| $NO_x$ | 500 ppm |
| HCl | 500 ppm |
| HC | 10 ppm |
| CO | 10 ppm |
| $CO_2$ | 16% |
| $N_2$ | 73% |

A myriad of methods exist for removing compounds or elements from flue-gas mixtures. The use of activated carbon is particularly noteworthy for its widespread application. Unfortunately, activated carbon injection is expensive, inasmuch as the sorbent has to be changed very frequently in high through-put scenarios. (T. D. Brown, *J. Air Waste Manage. Assoc.* (1999), 6, 1). Carbon-to-mercury weight ratios of 3000:1 to as high as 100,000:1 have been projected for duct injection of sorbent for mercury control.

Other researchers have demonstrated the photochemical oxidation of mercury by water or hydrogen chloride at room temperature. (H. E. Gunning, *Can. J. Chem.*, (1958), 36, 89 and C. C. McDonald et al, *Can J. Chem.* (1959), 37, 930.) However, those efforts are relegated to room temperature. Also, injection of water or other compounds are often required.

Attempts have also been made to use ultraviolet light (at 360 nm) to remove elemental mercury from flue gas streams. (P. Biswas, et al *J. Air Waste Manage. Assoc.*, (1998), 48, 113; *Environ Eng. Sci*, (1998), 15(2), 137). However, these efforts require a titanium oxide catalyst.

U.S. Pat. Nos. 5,863,413 and 6,048,500, awarded to Caren et al. on Jan. 26, 1999 and Apr. 11, 2000 respectively reveal that reactive hydroxyl radicals form when automobile exhaust gases are irradiated with 253.7 nm light. This results in the destruction (oxidation) of carbon monoxide and unburned hydrocarbons in the automobile exhaust. No treatment of mercury-containing or coal-derived flue gas is discussed therein.

Previous attempts to sequester specific compounds or elements from flue gas mixtures often involves first pre-treating the combustion products. For example, in situ conditioning of fly ash via injection of $SO_3$ often is necessary to enhance particulate removal by an electrostatic precipitator. Also, calcium sorbents often are injected into the ductwork of power plants for acid gas removal. And carbon sorbents have been injected in pilot-scale tests for mercury removal from coal-derived flue gas.

A need exists in the art for a method for removing mercury from fluid streams that does not involve high cost or the use of added compounds. The method should accommodate existing emission duct-work. And the method should operate at a myriad of temperatures so as to be applicable for power generation scenarios on an industrial, commercial and residential level. The method also should be applicable to municipal waste site processes.

SUMMARY OF THE INVENTION

It is an object of the present invention to provide a method for removing mercury from flue gas that overcomes many of the disadvantages of the prior art.

Another object of the present invention is to provide a method for extracting mercury from fluids. A feature of the invention is that the method can be performed at temperatures of 0° F. (or even to just above the melting point of mercury) and at temperatures as high as 350° F. An advantage of the invention is that it can be applied to a myriad of effluent scenarios.

Still another object of the present invention is to provide a method for extracting elemental mercury from flue gas. A feature of the invention is the gas-phase oxidation of the mercury via exposure to radiation having a wavelength of approximately 254 nm. An advantage of the invented method is the utilization of a simple ultraviolet irradiation treatment, with simple equipment similar to that used in water treatment plants for the eradication of microbes and oxidation of organic contaminants.

Briefly, the invention provides for a method for removing elemental mercury from a fluid, the method comprising irradiating the gas with light having a wavelength of approximately 254 nm.

Also provided is a method for removing elemental mercury from a fluid, the method comprising placing gas in an enclosure, irradiating the gas with light and removing oxidized mercury from the enclosure.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE INVENTION

Figure 1:
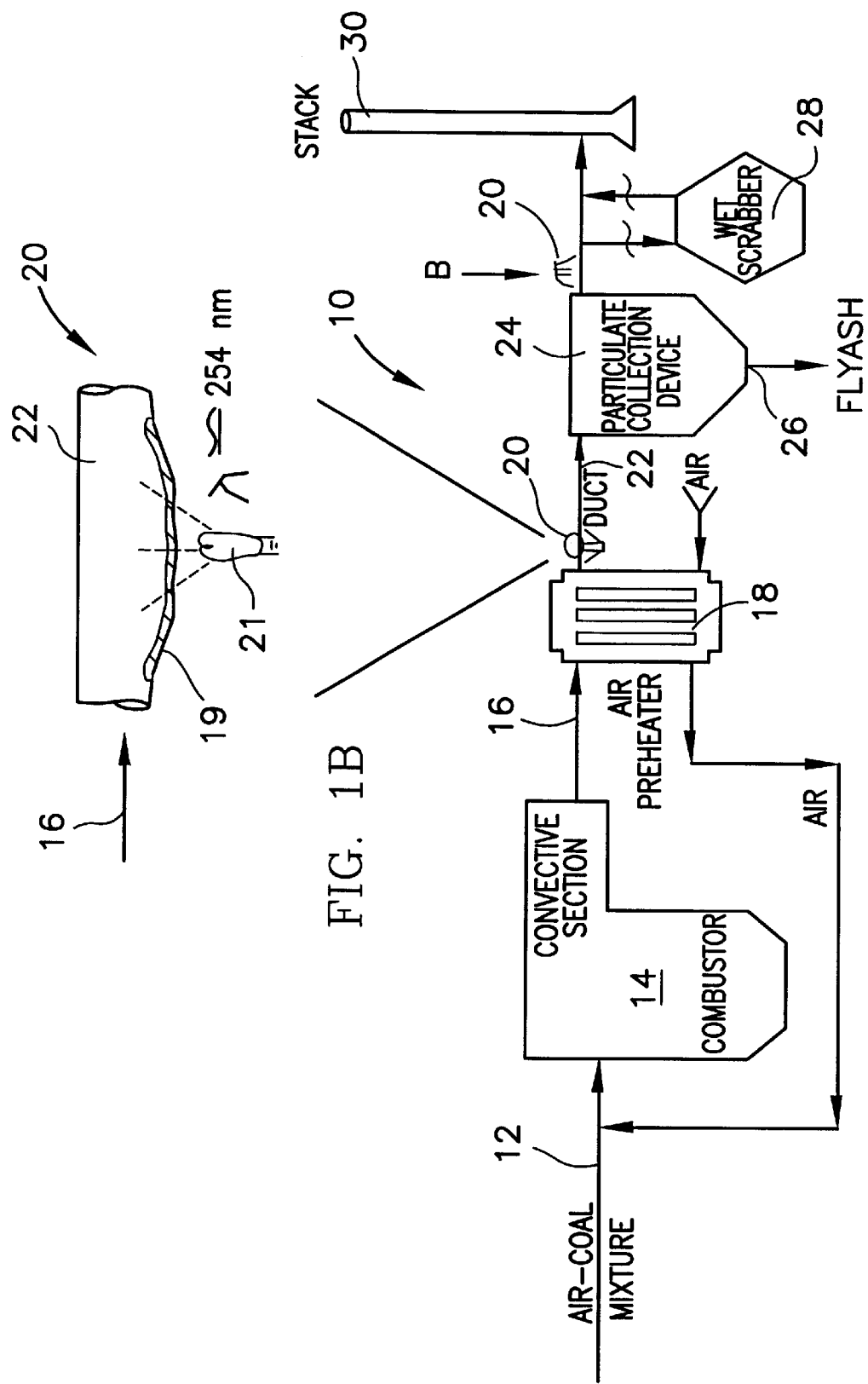
FIGS. 1A–B are schematic diagrams of a modified power plant effluent process, in accordance with features of the present invention.

The invented process is a viable alternative to activated carbon injection for mercury removal from flue gas. Fluids with elemental mercury concentrations up to 1 parts-per-million (ppm) can be treated with the method. Typically, concentrations up to to 600 parts-per-billion (ppb) are encountered in flue stream clean-up scenarios. The invention has been demonstrated on many simulated flue gases using a lab-scale photo-reactor.

The invented process can be utilized in any type of system that requires some type of mercury control. Applications include the treatment of flue gases arising from burning coal, oil, natural gas and biomass. Incinerator flue gases and municipal solid waste incinerator effluents also can be treated with the invented method. Inasmuch as the method can be used at a variety of temperatures, its application also could include the treatment of polluted indoor air, water vapor-containing fluids, engine exhaust treatment, refinery effluent treatment, and natural gas refining.

A salient feature of the process is that the mercury-containing fluid is in optical communication with radiation of predetermined wavelengths.

The process is capable of operating at temperatures ranging from 0° F. to temperatures as high as 350° F.

The method has no restrictive range of operating pressures. As such, flow rates typically seen in power plant and incinerator scenarios will suffice. All that is required is for the flue gas to move through the reaction chamber at a throughput rate concomitant with decreasing elemental mercury concentrations to target levels mandated by government flat.

In one embodiment of the invented process, mercury-containing flue gas is routed through a radiation transparent enclosure for irradiation. Upon irradiation, elemental mercury contained in the flue gas undergoes a gas phase oxidation to an oxide precipitate or a sulfate precipitate. Specifically, the radiation induces the elemental mercury to react with many of the components of flue gas, such as oxygen, sulfur dioxide, water, hydrogen chloride, and nitrogen oxides.

The overall reaction between mercury and oxygen in the presence of 253.7 nm light is given by equation (1):

$$Hg + 2O_2 + 253.7 \text{ nm light} \rightarrow HgO + O_3 \qquad (1)$$

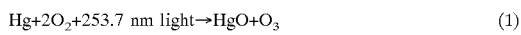

Water ($H_2O$), hydrogen chloride (HCl), sulfur oxides ($SO_x$), and nitrogen oxides ($NO_x$) can also serve as oxidizers of mercury in the presence of 254 nm ultraviolet light.

A myriad of oxidized mercury species are produced, including, but not limited to, HgO, $Hg_2SO_4$, $HgSO_4$, $HgCl_2$, $Hg_2Cl_2$, and $HgCl_2 \cdot 3HgO$.

The precipitate is physically removed from the enclosure as a solid via the use of filters situated downstream of the irradiation source. Alternatively, the precipitate is routed to a reservoir for solubilization and removal. This alternative sequestration technique is applicable when, and as noted in point B of FIG. 1, irradiation of the flue gas occurs downstream of the particulate collector but upstream of the wet scrubber. Elemental mercury is insoluble in water, whereas oxidized forms of mercury are much more soluble, facilitating removal in the scrubbing solutions often used for acid gas control. Those scrubbing solutions applicable in the instant removal processes include, but are not limited to, lime slurries, limestone slurries, calcitic lime slurries, and dolomitic lime slurries.

FIGS. 1A and 1B are schematic diagrams of a modified power plant emissions pathway, designated as numeral 10, incorporating the invented mercury-irradiation process. Generally, a source of flue gas 16 is routed from a combustion chamber 14 to and irradiation region 20. This region is defined by an enclosure, or duct-work, at least a portion of which is transparent to the radiation wavelength utilized for the conversion process. For example, when a radiation source 21 having a wavelength of 253.7 nm is utilized, the enclosure or duct-work confining the mercury-laden flue gas 16 is a least partially constructed with a quartz window 19 (as depicted in FIG. 1B), in as much a quartz is transparent to that particular wavelength.

Residence times of the flue gas is determinant upon the length of the irradiation region 20 and the flow rate of the gas. Generally, residence times of between one one-hundredth and one-tenth of a second are sufficient to oxidize the elemental mercury to within acceptable effluent standards. The oxidation process typical occurs in the gas phase.

After irradiation, the irradiated flue gas 22 containing oxidized mercury is subjected to a particulate collection device 24. The oxidized mercury and fly ash is then collected at a solid phase collection point 26 of the precipitator, while the treated effluent is further treated to a web scrubber 28 prior to expulsion to the atmosphere. Typically, the oxidized mercury adheres to the flyash, and as such, the collection of one begets the other.

As noted supra, the source of the flue gas can be any conventional fuel consumption- or any mercury-abatement scenario. The illustration in FIG. 1 depicts the fuel as an air-coal mixture 12 at coal-fired power plants.

Figure 2:
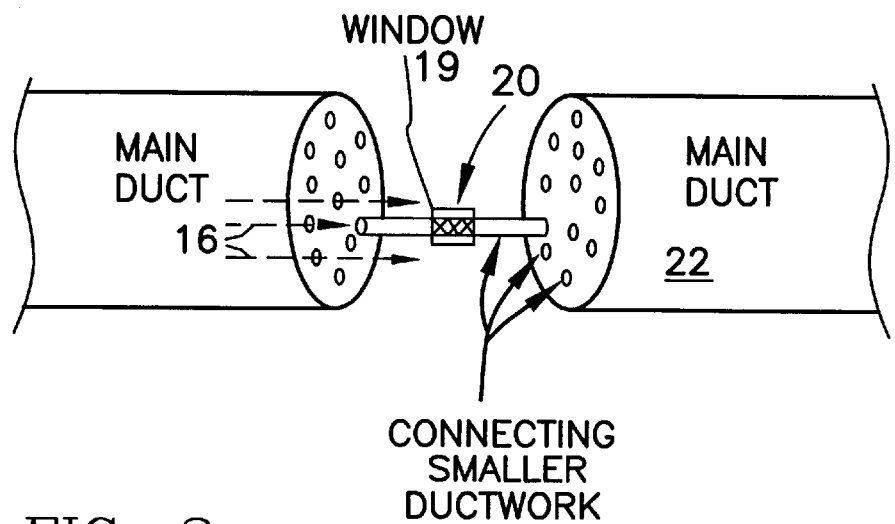
FIG. 2 is an alternative scheme of flue gas irradiation, in accordance with features of the present invention.

Instead of placing the irradiation source outside of the stream of subject fluid, the irradiation source also can be placed directly in the flue gas duct-work, as depicted in FIG. 2. The temperature of the duct-work at this region of the power-plant combustion process is approximately 300° F. In such an instance, the irradiation source is centrally located and coaxial to the longitudinal axis of the flue gas conduit 22.

As an alternative to the placement of the irradiation source 21 between a flue gas preheater 18 and the particulate collection device 24, the source 21 is placed downstream of the particulate collection device 24 but upstream from the final expulsion point 30 of the treated gas. At this location, temperature of the duct-work and the flue gas is approximately 250–350° F.

EXAMPLE

Figure 3:
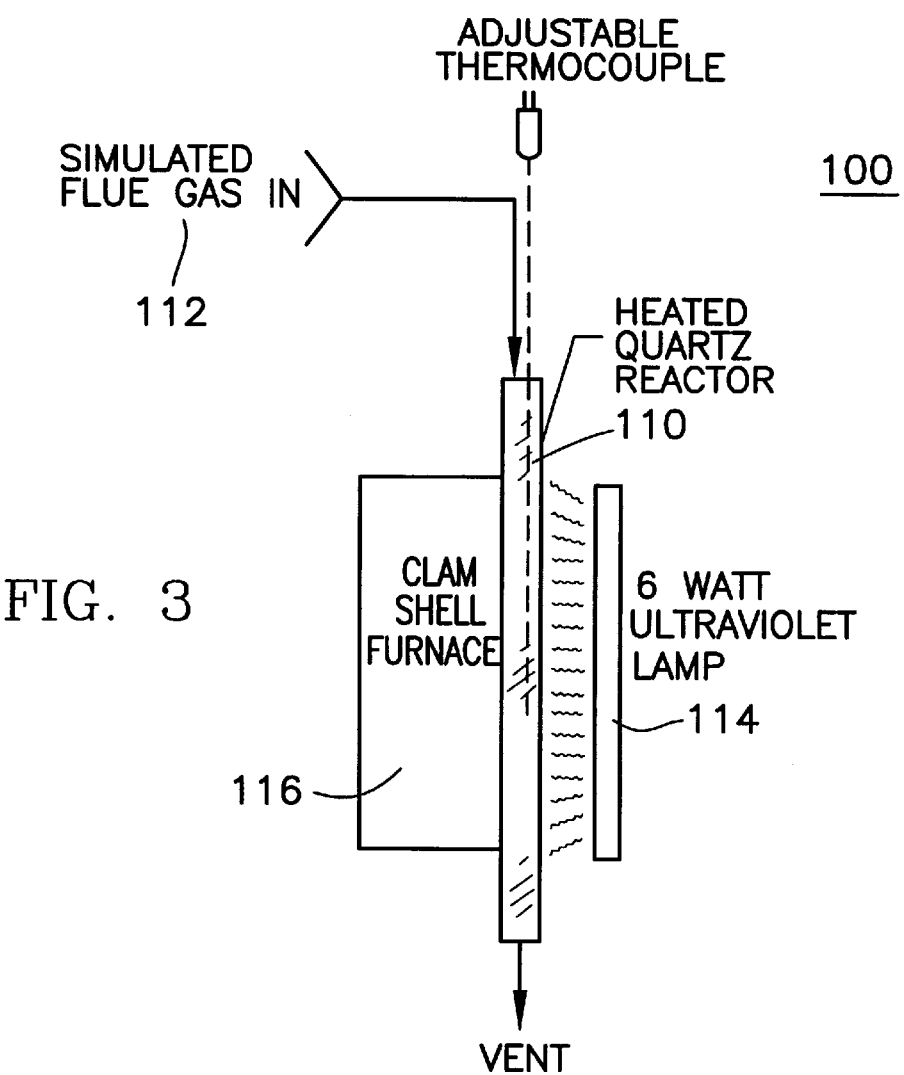
FIG. 3 is a schematic diagram of a lab-scale experimental device used for demonstration of oxidation of elemental mercury from simulated flue gases, in accordance with features of the present invention.

An assembly used for studying the photochemical oxidation of mercury is depicted in FIG. 3 as numeral 100. It should be noted that the device is presented herein in conjunction with the data obtained therefrom, only as an example. Flow rates, irradiation distances, and irradiation times are merely exemplary and should in no way be construed as limiting the scope of the invention. Instead, flow rates, irradiation times, and irradiation intensities are derived empirically and driven by the oxidation efficiencies corresponding to effluent control regulations and targets.

The assembly 100 consisted of an elemental mercury permeation tube (not shown) that was utilized as a source of elemental mercury, a heated quartz photo-reactor 110, a flue gas source 112, and ultraviolet lamps 114. Simulated flue gases flow through the photoreactor 110 which is irradiated with 253.7 nm light. Quartz is used for the photoreactor because it is transparent to 253.7 nm light.

A half-clam shell furnace 116 is used to heat the quartz photoreactor 110. The temperature profile is nearly isothermal within the section of the reactor 110 that is being irradiated. The back of the quartz reactor contacts the furnace so as to facilitate heat conductance from the furnace to the reactor. A 6-watt ultraviolet lamp from Spectroline was used as the source of 253.7 nm light. The quartz tubes were cleaned by rinsing first with 37% trace metals grade hydrochloric acid, then with distilled water, and last with trace metals grade acetone. The permeation tube is held at 212° F. in a nitrogen stream at all times and releases 159 ng elemental Hg/min. The permeation tube releases 55.7±3.3 micrograms of total mercury during the 350 minute irradiation of the flue gases.

The distance of the quartz photoreactor from the ultraviolet lamp was fixed at 1.75 inches. The intensity of 253.7 nm light at this distance from the lamp is 1.39±0.04 mW/cm$^2$, as measured by a standard radiometer, such as a Cole-Parmer VLX-3W digital radiometer. The gas mixtures entered and exited the photoreactor at near ambient pressure. The simulated flue gases were heated to either 280 or 350° F. (typical temperatures found after a particulate collection device in a coal-fired power plant), and the flow-rate was 60 ml/min. The composition of the simulated flue gases were either: A: 16% $CO_2$, 5% $O_2$, 2000 ppm $SO_2$, 300 ppb Hg, balance $N_2$ or B: 16% $CO_2$, 5% $O_2$, 2000 ppm $SO_2$, 500 ppm NO, 300 ppb Hg, balance $N_2$. Certified gases from Matheson (Pittsburgh, Pa.) were blended to make the simulated flue gases.

Cold vapor atomic absorption spectrophotometry (CVAAS) was used to determine the mass of mercury contained in the white-colored stains which formed within the quartz photoreactor. Generally, the desired product (i.e., the oxide or sulfate of the mercury) adhered to the inside surface of the quartz window.

Both 8-N HCl and acidic permanganate were used to dissolve the stains; the resulting solutions were analyzed by CVAAS. X-ray photoelectron spectroscopy (XPS) and scanning electron microscopy with energy-dispersive X-ray methods (SEM-EDX) were utilized to confirm the formation of mercury compounds on the walls of the quartz tubes. Ion chromatography (IC) of the dissolved stain was used to determine the mass of sulfate ion. Inductively coupled argon plasma atomic emission spectrometry (ICP-AES) was employed to determine the amount of sulfur within the stains.

The results for the photochemical reaction of elemental mercury with components nents of simulated flue gases are shown in Table 1. White stains formed within the quartz tubes. A variable but significant level of mercury was removed from the gases by irradiation with the ultraviolet light. Mercury capture is defined as the mass of mercury contained in the quartz photoreactor divided by the 55.7 micrograms of mercury that passes through the tube in 350 minutes.

TABLE 1

Photochemical Removal of Mercury From Flue Gases*

| Gas | T (° F.) | # of Replicates | Average Mercury Capture in Stain |
|-----|----------|-----------------|----------------------------------|
| A | 350 | 7 | 2.5 ± 2.0% |
| A | 280 | 5 | 71.6 ± 30.1% |
| A | 80 | 6 | 67.8 ± 28.8% |
| B | 280 | 2 | 46.1 ± 1.4% |

*Gas Compositions:
A: 16% $CO_2$, 5% $O_2$, 2000 ppm $SO_2$, 300 ppb Hg, balance $N_2$;
B: 16% $CO_2$, 5% $O_2$, 2000 ppm $SO_2$, 500 ppm NO, 300 ppb Hg, balance $N_2$.
*Gas residence time: 0.01 to 0.04 seconds.
*Flow-Rate: 60 ml/min.

The blank run showed an extremely low mass of mercury, indicating that the flow system is not contaminated. There was significant scatter in the mercury removals obtained by irradiation of flue gas A at both 280° F. and 80° F., as shown by the standard deviations of 30% and 29%. This is in accord with the known uncertainties in the radiation intensity, distance between the lamp and photo-reactor, chemical analysis for mercury, etcetera. Analyses with CVAAS, XPS, and SEM-EDX show that mercury in the simulated flue gases is photochemically oxidized by 253.7 nm light. From testing with simulated flue gas B, preliminary XPS analysis of the white stains suggest the formation of mercurous sulfate and mercuric oxide. The inventors demonstrated a high level of removal of mercury from many simulated flue gases using 253.7 nm light.

The inventors have found that the effect of temperature on photochemical reactions is quite different from that on thermal reactions, in that activation energy is acquired through the absorption of ultraviolet radiation rather than only through thermal energy. The inventors also found that the oxidized mercury compounds formed in their experiments, such as mercuric oxide or mercurous sulfate, tended to adhere to quartz surfaces to a higher degree at lower temperatures. The level of sensitized oxidation of mercury was determined by the mass of mercury within the stain on the quartz.

The actual levels of mercury oxidation may be close to 100 percent even at temperatures of 350 F. and higher. Physical adsorption and condensation of oxidized mercury on quartz is a low temperature process. As such, harvesting of the oxidized mercury adsorbed onto fly ash is facilitated at such low temperatures of between 0° F. and 320° F.

At elevated temperatures (above 320° F.) the oxidized mercury will not condense on the quartz, but may stay in the gas and exit the photoreactor. This would still be useful in a plant equipped with a wet scrubber for acid gas removal, as noted supra. Oxidized mercury compounds are soluble in water and the scrubbing solutions/slurries.

The invented method also removed high levels of elemental mercury from air and water vapor at temperatures up to 320° F.

A more extensive XPS analysis was conducted on a white deposit which formed after irradiating a simulated flue gas containing 16% $CO_2$, 5% $O_2$, 2000 ppm $SO_2$, 270 ppb Hg, and balance $N_2$. The gas was irradiated for 350 min at 280° F. XPS analysis again suggests the formation of mercurous sulfate. The mass of sulfur within the stain, as determined via ICP-AES, is consistent with the formation of mercury sulfate. The mass of sulfur also indicates that at 280° F. sulfur dioxide is reacting with the mercury to form mercury sulfate. Ion chromatography was also used to detect sulfate in a stain formed at 80° F. The sulfate ion was detected at levels suggesting significant removal of sulfur dioxide from the simulated flue gas.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for removing elemental mercury from a flue gas consisting of:
   providing a flue gas stream consisting of elemental mercury and one or more of the following: oxygen, sulfur oxides, water, hydrogen chloride, and nitrogen oxides,
   directing said flue gas stream through a reaction region,
   irradiating said flue gas stream using an ultraviolet radiation source, producing ultraviolet radiation having a wavelength of 253.7 nm, when said fluid is in said reaction region,
   controlling a flow rate associated with said flue gas stream as it passes through said reaction region to reduce a concentration of elemental mercury to a desired concentration level and to produce oxidized forms of mercury, and
   removing said oxidized forms of mercury from said flue gas stream.

2. The method as recited in claim 1 wherein the method is conducted at a temperature of between approximately 0° F. to temperatures as high as 350° F.

3. The method as recited in claim 1 wherein the elemental mercury is present in concentrations of up to 1 ppm.

4. The method as recited in claim 1 wherein the oxidized mercury is adsorbed to fly ash.

5. The method as recited in claim 1 wherein the oxidized mercury is a compound selected from the group consisting of HgO, $Hg_2SO_4$, $HgSO_4$, $HgCl_2$, $Hg_2Cl_2$, and $HgCl_2 \cdot 3HgO$.

6. The method as recited in claim 1 wherein the oxidized mercury is sequestered in solutions selected from the group consisting of lime slurries, limestone slurries, calcitic lime slurries, and dolomitic lime slurries.

7. The method as recited in claim 1 wherein the oxidized mercury forms an oxide precipitate or a sulfate precipitate.

8. The method as recited in claim 7 wherein the oxide or sulfate precipitate is removed from the flue gas stream using particulate collection devices situated downstream from said ultraviolet radiation source.

9. The method of claim 7 wherein the oxide or sulfate precipitate is removed at said reaction region.

10. A method for removing elemental mercury from a flue gas consisting of:
    providing a flue gas stream consisting of one or more of the following in addition to elemental mercury: oxygen, sulfur oxides, water, hydrogen chloride, and nitrogen oxides;
    routing said flue gas through a duct work or piping system where said system has an irradiation region located internal to said duct work or piping system;
    irradiating said flue gas, in said irradiation region, with ultraviolet light having a wavelength of 253.7 nm and where the elemental mercury undergoes a degree of gas phase oxidation to an oxide precipitate and/or a sulfate precipitate and where said degree of said gas phase oxidation is dependent on a time of exposure to said ultraviolet light; and
    removing said oxidized mercury.

11. The method as recited in claim 10 wherein the method is conducted at temperatures of 50° F. to 350° F.

12. The method as recited in claim 10 wherein said ultraviolet light originates from an ultraviolet light source located external to said irradiation region and where said duct work or piping system includes a window which is transparent to the ultraviolet light having a wavelength of 253.7 nm, thus, allowing said ultraviolet light to interact with said flue gas when said source is positioned so as to direct said ultraviolet light at said window.

13. The method of claim 12 where said window is a quartz window.

14. The method recited in claim 10 wherein the flue gas contains up to 1 ppm elemental mercury.

15. The method as recited in claim 10 wherein said ultraviolet light originates from a source positioned interior to said duct work or piping system at said irradiation region.

16. The method as recited in claim 10 wherein a temperature in said duct work or piping system is approximately 320° F. or less in the irradiation region and said oxidized mercury is removed as a particulate.

17. The method as recited in claim 10 wherein a temperature in said duct work or piping system is approximately 320° F. and said oxidized mercury is removed by employing downstream liquid scrubbing techniques.

18. The method as recited in claim 17 wherein the oxidized mercury is sequestered in a solution selected from the group consisting of lime slurries, limestone slurries, calcitic lime slurries, and dolomitic lime slurries.

19. The method of claim 10 wherein said oxidized mercury is removed at a location down stream from said irradiation region.

20. The method of claim 10 wherein said oxidized mercury is removed at said irradiation region.

* * * * *